(12) United States Patent
Trofin et al.

(10) Patent No.: US 6,661,778 B1
(45) Date of Patent: Dec. 9, 2003

(54) METHOD AND APPARATUS FOR STATISTICS COLLECTION IN A DATA COMMUNICATION NETWORK

(75) Inventors: Mircea Trofin, Kitchener (CA); Jeffrey J. Furry, Kanata (CA); Angelo Buonicore, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/524,201

(22) Filed: Mar. 13, 2000

(51) Int. Cl.[7] .................................................. H04J 3/14
(52) U.S. Cl. ....................................................... 370/252
(58) Field of Search ................................. 370/252, 241, 370/469; 379/136; 706/16

(56) References Cited

U.S. PATENT DOCUMENTS

| | | | | |
|---|---|---|---|---|
| 5,129,037 A | * | 7/1992 | Kirk et al. .................... 706/16 |
| 5,231,593 A | * | 7/1993 | Notess ........................ 370/252 |
| 5,243,543 A | * | 9/1993 | Notess ........................ 370/252 |
| 5,623,590 A | * | 4/1997 | Becker et al. ............... 379/136 |
| 6,115,393 A | * | 9/2000 | Engel et al. ................. 370/469 |
| 6,366,563 B1 | * | 4/2002 | Weldon et al. .............. 370/252 |

* cited by examiner

Primary Examiner—Salvatore Cangialosi

(57) ABSTRACT

A method and apparatus for statistics collection in a data communications network is presented that utilizes a lower level protocol to locally verify the status of the nodes included in each of the various segments within the network. Indications as to the functional status of each of the nodes included in each of the segments are maintained based on periodic status checks. This set of indications can then be referenced to determine whether or not statistics requests should be issued to particular nodes such that those nodes that are not properly functioning are not be polled. By ensuring that any statistics requests that are issued are being issued to functional nodes, statistics polling bandwidth which may have been wasted on non-functioning nodes is conserved, thus improving the likelihood that the statistics for the various portions of the network can be retrieved in a timely and loss-less manner.

27 Claims, 3 Drawing Sheets

METHOD AND APPARATUS FOR STATISTICS COLLECTION IN A DATA COMMUNICATION NETWORK

FIELD OF THE INVENTION

The invention relates generally to data communications, and more particularly to a method and apparatus for statistics collection in a data communications network.

BACKGROUND OF THE INVENTION

Data communications networks include a plurality of nodes, or switches, which are intercoupled to allow users of the network to communicate information to each other. Each of these nodes may maintain a set of statistics relating to the network traffic, where the statistics may be used for purposes such as billing users of the network, evaluating network performance, and isolating faults that may be present within the network. Typically these statistics are maintained via counters internal to the nodes. Such counters are often configured to reset after a predetermined time period, which may be on the order of 15 minutes. As such, the statistics must be collected at least every 15 minutes in order to ensure that no loss of statistic information occurs.

In prior art systems, the statistics collection circuitry for the network typically sent statistics requests using the simple network management protocol (SNMP) or other various proprietary internal protocols appropriate for the nodes within the network. Such statistics requests are of low priority and a significant time period is allocated in which the response to the statistics requests may be received. Unfortunately, if a node is inoperative, or "down", valuable time and resources are wasted waiting for a response during the lengthy timeout period. In addition, a network is typically only capable of supporting a limited number of statistics polling requests at one time. As such, polling down nodes can waste valuable polling bandwidth, thus jeopardizing the timely collection of all the desirable statistics within the network.

In some prior art systems, a network management platform may detect the down nodes and provide notice to the one or more statistics collectors that may be present within the network. However, the network management platform may be on different workstation than the statistics collectors such that a time delay is experienced for notification of the statistics collectors. Thus, although the notification may prevent some statistics requests to down nodes, the time delay associated with propagation of the notice of the down nodes still presents a certain level of wasted polling bandwidth. In addition, the perspective with which the network management platform perceives the various nodes in the network may differ from that of the statistics collectors that must interface with the nodes in order to collect the statistics for the nodes. As such, nodes may be fully functional from the perspective of the network management platform, whereas a faulty connection may exist between a statistics collector and a node to be polled, thus rendering responses to issued statistics requests to the node impossible.

Therefore, a need exists for a method and apparatus for determining node status prior to statistics request polling that provides timely information regarding the status of nodes from the perspective of the statistics collection circuitry.

DETAILED DESCRIPTION OF A PREFERRED EMBODINENT OF THE INVENTION

Generally, the present invention provides a method and apparatus for statistics collection in a data communications network that utilizes a lower level protocol to locally verify the status of the nodes included in each of the various segments within the network. Indications as to the functional status of each of the nodes included in each of the segments are maintained based on periodic status checks. This set of indications can then be referenced to determine whether or not statistics requests should be issued to particular nodes such that those nodes that are not properly functioning are not polled. By ensuring that any statistics requests that are issued are being issued to functional nodes, statistics polling bandwidth which may have been wasted on non-functioning nodes is conserved, thus improving the likelihood that the statistics for the various portions of the network can be retrieved in a timely and loss-less manner.

Figure 1:
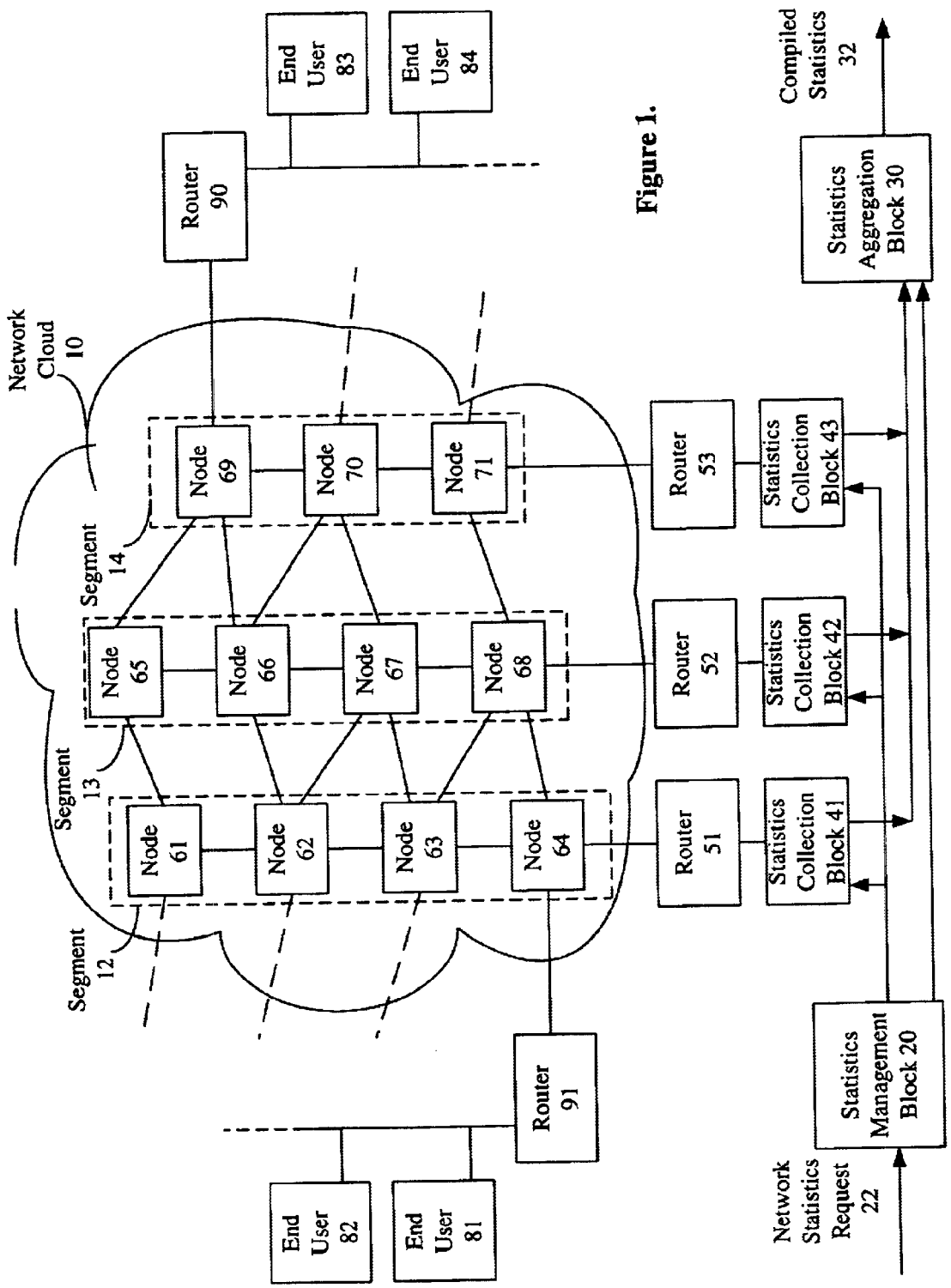
FIG. 1 illustrates a block diagram of a network including statistics collection circuitry in accordance with a particular embodiment of the present invention.

The invention can be better understood with reference to FIGS. 1–4. FIG. 1 illustrates a block diagram of a data communications network that includes the capability for compiling statistics that are recorded by various nodes included within the data communications network. The data communications network includes a network cloud 10 that includes a plurality of intercoupled nodes, or switches, 61–71. The network cloud 10 may support the asynchronous transfer mode (ATM) protocol such that the nodes 61–71 may be ATM nodes or switches. Preferably, the nodes 61–71 included in the network cloud 10 are grouped into a number of segments 12–14. The first segment 12 is shown to include nodes 61–64, the second segment 13 includes nodes 65–68, and the third segment 14 includes nodes 69–71. End users 81–84 may be coupled to the network cloud 10 via routers 90 and 91 such that data can be exchanged amongst the end users 81–84. For example, the end user 81 may communicate with the end user 84 via the router 91, the network cloud 10, and the router 90.

In many cases, it is desirable to monitor the traffic going across the network cloud 10 for purposes such as billing the various end users, detecting or isolating faults within the network cloud 10, and for managing overall network performance. As such, each of the nodes 61–71 may include a number of counters, or other means for maintaining a set of statistics relating to traffic flow through the node and possibly other characteristics of the node. In many cases, these counters are configured to reset regardless as to whether or not they are read after a predetermined time period. As such, timely polling of these counters to harvest the information that they store must occur or the overall statistics collection process will produce incomplete or inaccurate results.

As is illustrated, each of the node segments 12–14 is operably coupled to a statistics collection block 41–43. The statistics collection blocks 41–43 may be coupled to the node segments 12–14 via routers 51–53. Each statistics collection block is responsible for gathering the appropriate statistics within a particular node segment. In order to do so, each statistics collection block maintains indications as to the status of each of the nodes included in its corresponding node segment.

When a statistics collection block receives statistics collection configuration information from the statistic management block 20, the statistics collection block will selectively issue statistics requests to nodes within its node segment. Statistics requests issued to the various nodes in the network cloud 10 may be issued using SMNP or various proprietary protocols commonly used for polling nodes within the network to retrieve statistics. The selective issuance is based on the indication as to the status of the various nodes that should be polled based on the statistics collection configuration information. For example, if the statistics collection configuration information indicates that a particular counter in each of the nodes 61–64 should be polled, the statistics collection block 41 will determine which of these nodes 61–64 are currently functional, or "up". For those nodes that are currently up, statistics requests will be issued such that the requested statistics are retrieved. If it is determined that one or more of the nodes are down, the statistics requests that normally would have been generated in prior art solutions will not be issued. This conserves the limited polling bandwidth available to the statistics collection block 41.

In order to determine the status of each of the nodes 61–64, the statistics collection block 41 will periodically issue status monitoring packets to each of the nodes 61–64. These status monitoring packets require each of the nodes 61–64 to return a response, which, if returned, indicates that the node is functional, or up. A lack of response by any node may indicate that the node is not functioning properly (down).

Preferably, the time within which each of the nodes 61–64 is allowed to respond to a status monitoring packet is limited. If the node does not respond within the predetermined response time, it is assumed that the node is down, and statistics requests to that node will be delayed until favorable status of the node is determined by a timely response to a subsequently issued status monitoring packet.

In order to ensure that the status monitoring packets are processed by the nodes within a reasonable period of time, a lower level protocol such as the universal data protocol (UDP) may be used to send the status monitoring packets. UDP status monitoring packets issued by the statistics collection block 41 to the various nodes 61–64 included in the node segment 12 will allow the statistics collection block 41 to ascertain the current status of each of the nodes 61–64 from the proper perspective, which is the perspective of the block wishing to collect the statistics.

A timely response to status monitoring packets, or lack thereof, enables the statistics collection block 41 to ascertain the status of each of the nodes 61–64. This status information may be maintained within a list or database such that when statistics requests are to be generated for the nodes 61–64, the list or database can be consulted to determine whether or not the various nodes are up. The periodicity with which the various nodes are polled with status monitoring packets in order to confirm their status may vary based on a number of factors. Thus, status monitoring packets may be issued more frequently to certain nodes, whereas other nodes receive fewer and less frequent status monitoring packets. The prioritization scheme that determines how often status monitoring packets are sent to the various nodes may be based on the frequency with which the statistics for the particular node are requested. In such cases, more active nodes may be polled as to their status more often than less active nodes. In other cases, the periodicity may increase if the node is experiencing problems and has exhibited an inconsistent status as to being up or down. Similarly, those nodes that have a history of maintaining a relatively stable status may be provided with status monitoring packets on a less frequent basis, thus reducing the amount of status monitoring packets that may be required to ascertain the status of all the nodes, thus leading to better usage of the status monitoring resources and placing less strain on the network.

The periodicity with which the various nodes are polled for their status may be adapted based on each response, or lack thereof, to a status monitoring packet. A number of variables may be maintained in order to monitor the short and long term consistency with regard to the status of various nodes. Coupling these consistency values with a level of priority, or frequency with which statistics are retrieved from a particular node, can determine the periodicity with which a particular node is polled in order to determine its status.

Note that in order to ensure that the network is not flooded with status monitoring packets, the number of status monitoring packets issued and for which responses are pending may be limited. The number of outstanding status monitoring packets that prevents a status monitoring packet directed to a specific node from being issued may vary for different nodes. For example, a status monitoring packet for a low-priority node may not be issued if a first threshold number of status monitoring packets are pending, whereas a status monitoring packet for a high-priority node may still be issued once the first threshold number is reached. In order to maintain accurate status information, if a status monitoring packet for a node is not issued based on the overabundance of outstanding status monitoring packets, the priority of that node may be slightly increased such that eventually the status of the node will be obtained.

Each node within the network cloud 10 may include a number of subcomponents. The hierarchical structure of a node may include a number of cards, where the cards may include a number of devices, and where the devices may each support a number of connections. In some cases, each of these hierarchical components may include specific counters geared towards collecting statistics for that particular hierarchical component. As such, a statistics request from a statistics collection block may be targeted at a particular counter within a particular hierarchical component within a node. In some instances, various hierarchical components may be non-functional while the node in general is up and running. In such instances, information regarding the status as to various hierarchical components within the node may be returned in responses to the status monitoring packets such that the statistics collection block will have knowledge of any non-functioning hierarchical components and will not issue statistics requests for non-functioning hierarchical components.

If the statistics collection block is capable of distinguishing between various hierarchical components with regard to statistics collection, the statistics collection block may maintain a more detailed list that stores the hierarchical status of each node in the node segment to which the statistics collection block is coupled. This list may include a tree-like structure for each node that is based on the hierarchical structure of the node. The hierarchical status for each node would include the status of each of the components within the node. Thus, the hierarchical status for the node 61 would include the status as to each of the cards within the node, each of the devices within those cards, and possibly even each of the connections supported on each of the devices. Note that the level of granularity with which the status is maintained for each node may be adapted to suit the needs of the particular system.

The statistics requests selectively issued to the various nodes by the statistics collection blocks are generated based on statistics collection configuration information that may be provided by the statistics management block 20. The statistics management block 20 receives network statistics requests 22 that may be generated by a user, an automatic billing routine, or some similar entity that requires a particular statistic, or set of statistics from the network. The statistic management block 20 parses the network statistics requests 22 into a number of sets of statistics collection configuration information that it provides to each of the statistics collection blocks 41–43.

The parsing performed by the statistics management block 20 is based on the distribution of the nodes that contain the requested statistics amongst the various node segments 12–14. For example, a specific network statistics request may be generated that requests the number of data packets being sent through the network cloud 10 from the end user 81 to either of the end users 83 and 84. The statistics management block 20 would receive this request and generate statistics collection configure information which would be provided to each of the statistics collection blocks 41–43 such that they would individually collect the statistics corresponding to traffic sent by the end user 81 from the various nodes included in each of their corresponding node segments 12–14. Each individual statistics collection block would selectively issue statistics requests to the nodes within its corresponding segment based on the current status of each of the nodes within its corresponding segment.

When the nodes within each of the node segments 12–14 respond to the statistics requests that have been issued, the responses for each individual node segment are collected by its corresponding statistics collection block to generate segment statistics. Thus, the statistics collection block 41 would determine the data traffic corresponding to the user 81 within the nodes 61–64. It would provide these relevant statistics to a statistics aggregation block 30. The statistics aggregation block 30 is operably coupled to each of the statistics collection blocks 41–43 and receives the segment statistics generated by each of the statistics collection blocks 41–43. The statistics aggregation block aggregates the segment statistics to produce compiled statistics 32 that are provided as a response to the network statistics request received by the statistics management block 20. In the case where the desired set of compiled statistics relates to the number of data packets that have traversed the network from the end user 81 to either of the end users 83–84 as seen by each of the nodes, the aggregation of the segments statistics by the statistics aggregation block 30 may simply include adding up the various segment totals. In other cases, the network statistics request 22 may require a comparison of the statistics between different segments. For example, if the traffic between the node 61 and node 65 needs to be ascertained, some comparison operation between the traffic at each node may be required. In such cases, the statistics aggregation block 30 will perform the appropriate combination of the segment statistics collected from each segment in order to generate the appropriate set of compiled statistics 32.

By allowing each of the statistics collection blocks 41–43 to acquire and maintain status information as to the particular nodes within the respected node segments, the statistics collection blocks 41–43 can generate statistics requests to the nodes in an intelligent manner. As such, requests will not be issued to inoperative nodes, and the limited polling bandwidth available will be used more efficiently than was possible in prior art systems. This enables polling of all of the relevant counters within the nodes in a timely manner such that none of the counters are cleared before their statistic information is retrieved. Because the perspective from which the status monitoring packets are provided to the nodes is the same perspective as that from which the statistics requests are issued, the relevance of the status determinations is greater than that in prior art systems in which status could have been determined by a network management block coupled to the nodes via different physical paths than the statistics collection blocks.

Figure 2:
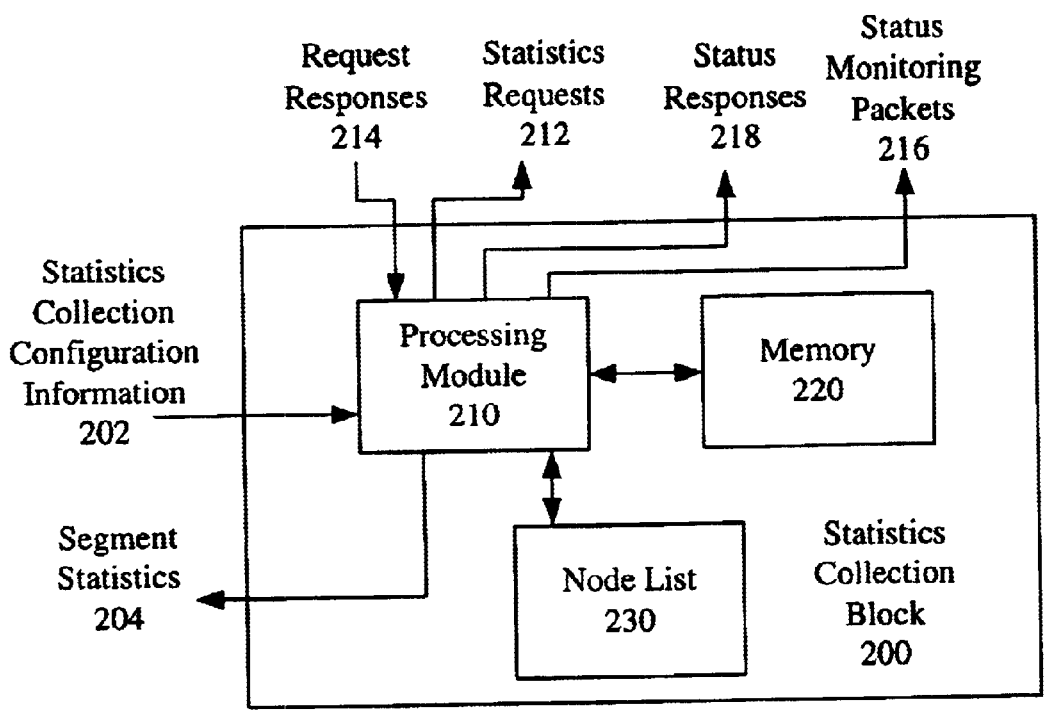
FIG. 2 illustrates a block diagram of a statistics collection block in accordance with a particular embodiment of the present invention.

FIG. 2 illustrates a block diagram of a statistics collection block 200 as it may be constructed in one embodiment of the invention. The statistics collection block 200 is shown to include a processing module 210, a memory 220, and a node list 230. Note that the node list 230 may be maintained within the memory structure 220 such that it is not actually a separate circuit block. The processing module 210 may be a single processing device or a plurality of processing devices. Such a processing device may be a microprocessor, microcontroller, digital signal processor, microcomputer, state machine, logic circuitry, or any device that processes information based on operational or programming instructions.

The memory 220 may be a single memory device or a plurality of memory devices. Such a memory device may be a read only memory device, random access memory device, floppy disk, hard drive memory, or any device that stores digital information. Note that if the node list 230 is included within the memory 220, at least a portion of the memory 220 must include read/write capability. Note that when the processing module 210 has one or more of its functions performed by a state machine or logic circuitry, the memory containing the corresponding operational instructions is embedded within the state machine or logic circuitry.

Figure 4:
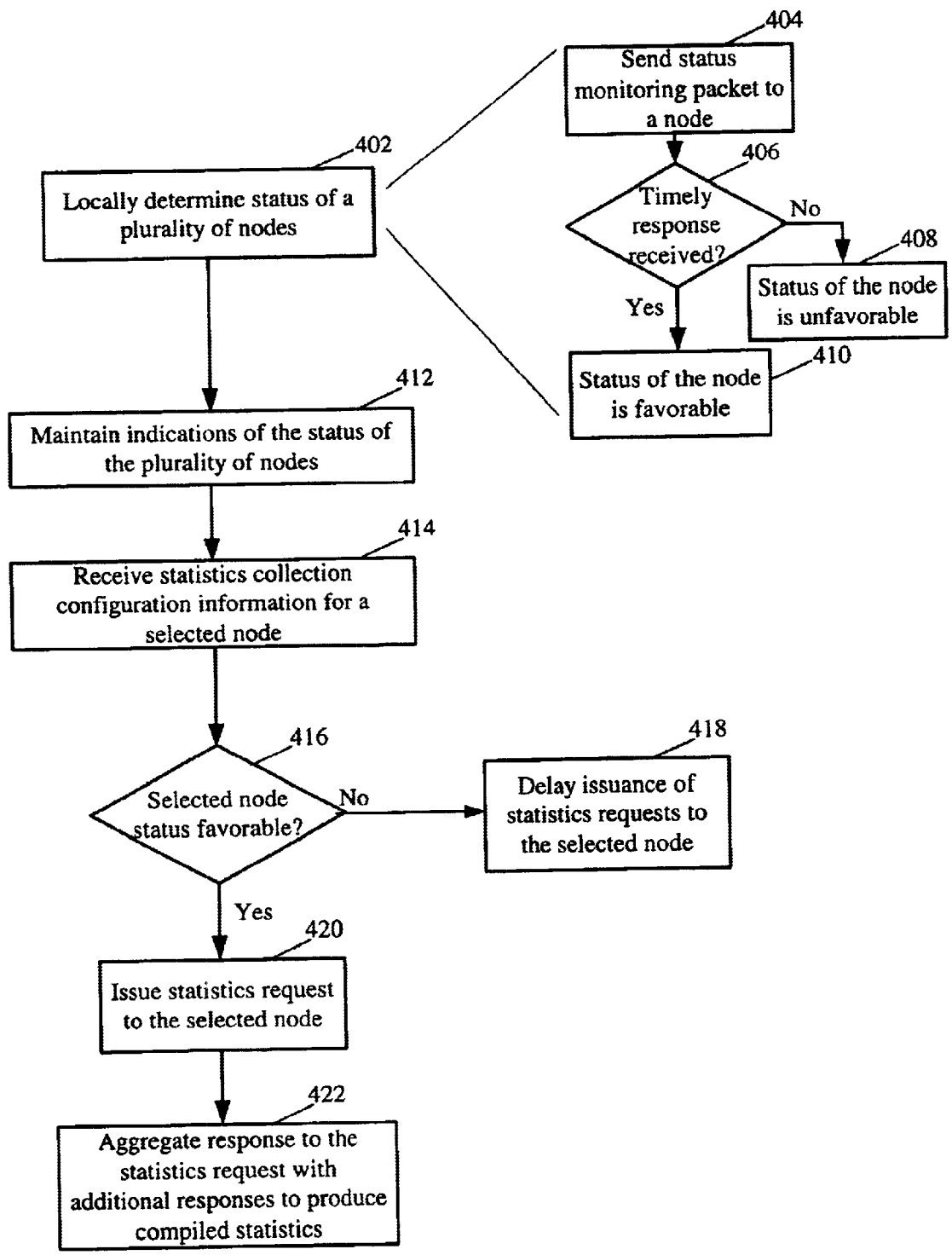
FIG. 4 illustrates a flow diagram of a method for statistics collection in a data communications network in accordance with a particular embodiment of the present invention.

The memory 220 stores programming or operational instructions that, when executed by the processing module 210, cause the processing module 210 to perform at least a portion of the method illustrated in FIG. 4. The method illustrated in FIG. 4 encompasses the maintenance of status information of a plurality of nodes in a segment and the issuance and collection of statistic responses to and from those nodes. Note that the statistics collection block 200 may implement some of the functions of the method of FIG. 4 through the use of software stored in the memory 220, whereas other portions of the method may be implemented using hardware or circuitry included within the statistics collection block 200. Thus, in some embodiments, a mix of hardware and software may be used to obtain and store status information for the nodes within the node segment as well as generate and process the statistics requests sent to and received from those nodes.

The statistics collection block 200 is adapted to couple to a node segment included in a network. The node segment preferably includes a plurality of nodes, each of which includes counters corresponding to statistics monitored by the node. In order to intelligently generate statistics requests to these nodes, the statistics collection block 200 determines the status of each of the nodes and maintains that status information. The status information can then be used in conjunction with received statistics collection configuration information 202 to generate the statistics requests 212 issued to the nodes in the node segment.

In order to ascertain the status of the nodes, the statistics collection block 200 generates status monitoring packets 216 which are periodically sent to each of the nodes within the node segment. If a node is functioning properly, a status response 218 will be sent by the node, thus informing the statistics collection block 200 that the node is up. Nodes which do not provide status responses within a predetermined time period are determined to be down. As such, these down nodes will not be issued statistics requests until a favorable status is determined by timely receipt of a response to a subsequently issued status monitoring packet. Preferably, the status monitoring packets 216 are issued as universal data protocol (UDP) status monitoring packets as described earlier.

In order to maintain the indications as to the status of each of the nodes of the plurality of nodes in the node segment which the statistics collection block 200 supports, the statistics collection block 200 may include a node list 230. The node list 230 stores the identities of the various nodes within the node segment along with an indication as to whether each of the nodes is up or down. Note that in other embodiments the node list 230 may only store the identities of up nodes, or only those of down nodes, such that a consultation of the node list 230 can be used to determine whether or not a statistics request should be issued to a particular node. As stated earlier, the node list 230 may be stored within a portion of the memory 220.

When the processing module 210 receives statistics collection configuration information 202 that requires a number of statistics requests 212 to be issued to one or more nodes within the node segment, the processing module 210 will consult the node list 230. If the statistics collection configuration information 202 requires a statistics request to be generated for a selected node, the processing module 210 will determine if the status of that selected node is currently favorable by referencing the node list 230. If the status of the selected node is favorable, the processing module 210 will generate a statistics request 212 for the selected node. The request response 214 from that node may then be combined with other request responses to generate a set of segment statistics 204 that may be provided to a statistics aggregation block as was described with respect to FIG. 1.

Figure 3:
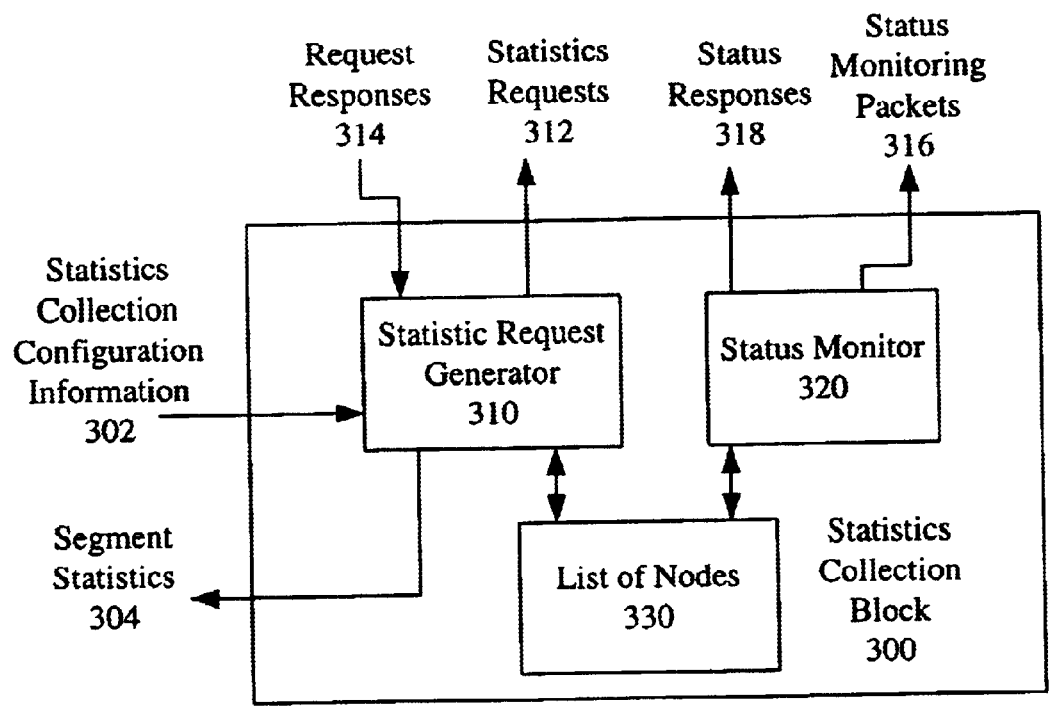
FIG. 3 illustrates a block diagram of an alternate statistics collection block in accordance with a particular embodiment of the present invention.

FIG. 3 illustrates an alternate embodiment of a statistics collection block 300 in which the function of monitoring status of the nodes included in a node segment is separated from the function of collecting the statistics from the nodes in the node segment. The statistics collection block 300 is shown to include a statistics request generator 310, a status monitor 320, and the list of nodes 330 that is operably coupled to both of the statistics request generator 310 and the status monitor 320.

The status monitor 320 issues status monitoring packets 316 to the various nodes included in the node segment which the statistics collection block 300 supports. The statistic monitoring packets 316 are periodically issued as was described with respect to FIG. 1 above. Status responses 318 received from the nodes in the node segment are processed by the status monitor 320 to determine the status of the various nodes within the node segment. The status of the nodes is maintained within the list of nodes 330, which may include a hierarchical tree-like structure that includes status of the various hierarchical components of each of the nodes.

The statistics request generator 310 receives statistics collection configuration information 302, which may be generated by a statistic management block such as that illustrated in FIG. 1. In response to the statistics collection configuration information 302, the statistics request generator 310 determines which nodes must be polled to gather the various statistics as requested by the statistics collection configuration information 302. The statistics request generator 310 consults the list of nodes 330 to determine whether or not the nodes that it intends to poll are known to be functioning properly. If the list of nodes 330 indicates that the status of any of the nodes to be polled is unfavorable, statistics requests targeted for those nodes are not issued. Nodes that have favorable status are provided with statistics requests 312 and provide request responses 314 in return. The statistics request generator 310 may then process the request responses 314 to produce the segment statistics 304 which may be provided to a statistics aggregation block as described with respect to FIG. 1.

FIG. 4 illustrates a flow diagram of a method for statistics collection in a data communications network. A data communications network may include a plurality of node segments where each of the plurality of node segments includes a plurality of nodes. Each node segment may be serviced by an individual statistics collection block as was described with respect to FIG. 1 above. The flow diagram illustrated in FIG. 4 is generally structured to correspond to the operations performed by one of the statistics collection blocks that is servicing a particular node segment.

The method of FIG. 4 begins at step 402 where the status of the plurality of nodes included in a particular node segment is locally determined. The local determination of the status of the plurality of nodes indicates that the status is ascertained by a local entity such as a statistics collection block dedicated to that particular segment. Preferably, the entity that determines the status of the plurality of nodes is also the entity that will issue the statistics requests to the various nodes in order to gather the statistics.

Step 402 may be performed as is illustrated in steps 404–410. Steps 404–410 may be repeated for each of the nodes in the node segment on a periodic basis, where the periodicity of execution of steps 404–410 for each of the nodes may vary based on a nodes priority, or its history of functionality. Thus, nodes that are consistently functional or non-functional may be polled less frequently than those that are more erratic in behavior. Similarly, high priority nodes may be polled more often such that variations in their functionality will be detected quickly.

At step 404, a status monitoring packet is sent to the node whose status is being verified. The status monitoring packet is preferably sent using a low level protocol within the data communications network. In one embodiment, UDP status monitoring packets are utilized. Note that the issuance of the status monitoring packet to the node may be delayed if the number of currently pending status monitoring packets in the network exceeds a threshold number. The threshold number of pending status monitoring packets that would delay or negate issuance of an additional status monitoring packet may be based on the priority level of the node whose status is to be checked, where the priority level of a node may be adjusted based on the issuance or delay in issuance of a status monitoring packet.

At step 406, it is determined whether a timely response to the status monitoring packet issued at step 404 has been received. A timely response may correspond to a response that is received within a predetermined time period after the issuance of the status monitoring packet. If a timely response is not received at step 406, the method proceeds to step 408 where the status of the node is determined to be unfavorable. An unfavorable status may be equated with the node being down, or generally non-functional. If a timely response is received at step 406, the method proceeds to step 410 where the status of the node is determined to be favorable. Favorable status indicates that the node is generally functioning as expected, and therefore is likely to respond to statistics requests in a timely manner.

Once the status of the nodes is determined at step 402, the method proceeds to step 412 where indications as to the status of the plurality of nodes are maintained. The indications may be stored in a list structure, or similar database that may be referenced. The list may include a hierarchical set of status indications for each of the nodes such that the status of the hierarchical components of each node is also maintained. The list maintained at step 412 may also be used for the issuance of the status monitoring packets at step 404. The list maintained at step 412 may be ordered based on prioritization information such that the position of a particular node within the list is used to determine the periodicity with which status monitoring packets are sent to that node.

At step 414, statistics collection configuration information is received. The statistics collection configuration information received at step 414 is processed to determine that the statistics contained within at least one of the nodes included in the node segment should be gathered for further processing. For each selected node to which the statistics collection configuration information corresponds, a determination is made as to the current status of the node such that the decision as to whether or not to issue a statistics request can be made.

At step 416, it is determined if the status of the selected node is favorable. If not, the method proceeds to step 418 where issuance of statistics requests to that selected node is delayed. The delay may include discarding the statistics requests that would normally be issued if the status were favorable, or possibly waiting to issue the statistics request until a favorable status is detected for that particular node. If the status of the selected node is determined to be favorable at step 416, the method proceeds to step 420. At step 420, a statistics request is issued to the node such that the node will respond with the desired statistic information. Note that step 416 may include determining if the status of a particular node hierarchical component is favorable. Thus, the granularity with which statistics requests are issued and with which status information is maintained may be at the sub-node level. For example, a statistics request may be targeted specifically to a particular card within a node. In such an instance, the status of that particular card may be ascertained rather than the status of the overall node, as the node may be functioning properly whereas the particular card within the node is experiencing problems.

At step 422, responses received from various nodes within the segment, and possibly within a plurality of segments, are aggregated to produce compiled statistics that may be further processed to help perform various network functions. Examples of network functions that may utilize the statistics collected include the billing of customers that utilize the network, determining performance statistics with regard to data traffic within the network, and maintaining a set of error statistics that may be used to improve overall network functionality.

By allowing for a distributed polling system in which individual statistics collection blocks independently determine the current status of the various nodes for which they are responsible for collecting statistics, the limited polling bandwidth available for statistics collection in a network can be used more efficiently. The method and apparatus described herein enables statistics collection to be performed in a more efficient manner such that the statistics can be collected within the network in a timely manner thus ensuring that counters which reset on a periodic basis do not do so without first having the statistics which they store collected.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for statistics collection in a data communications network, comprising:
for each segment within the data communications network:
locally determining status of a plurality of nodes included in the segment using a status monitoring block local to the segment;
maintaining indications as to the status of each of the plurality of nodes included in the segment;
receiving statistics collection configuration information corresponding to a selected node of the plurality of nodes included in the segment; and
when the indication as to the status of the selected node indicates that the status of the selected node is favorable, issuing a statistics request to the selected node based on the statistics collection configuration information.

2. The method of claim 1, wherein locally determining status of the plurality of nodes further comprises:
for each node of the plurality of nodes:
issuing a status monitoring packet to the node; and
determining if a response is received, wherein, if received, the response indicates favorable status of the node.

3. The method of claim 2, wherein determining if a response is received further comprises determining if the response is received within a predetermined response time.

4. The method of claim 2, wherein issuing a status monitoring packet further comprises issuing the status monitoring packet using a low level protocol within the data communications network.

5. The method of claim 4, wherein issuing the status monitoring packet further comprises issuing universal data protocol (UDP) status monitoring packet.

6. The method of claim 5, wherein issuing status monitoring packets to nodes in the plurality of nodes is based on a node list that includes identity each node of the plurality of nodes included in the segment.

7. The method of claim 6, wherein the list includes prioritization information for each node in the plurality of nodes included in the segment.

8. The method of claim 1 further comprises aggregating statistics collected in response to statistics requests by each segment to produce compiled statistics information.

9. The method of claim 7, wherein aggregating statistics further comprises aggregating statistics corresponding to at least one of billing statistics, performance statistics, and error statistics.

10. The method of claim 1 further comprises for each node: when the indication as to the status of the selected node indicates that the status of the selected node is unfavorable, delaying issuance of statistics requests to the selected node until a favorable response is received in response to a subsequent status monitoring packet.

11. A statistics collection block adapted to couple to a plurality of nodes in a data communications network for statistics collection, comprising:

a processing module; and memory operably coupled to the processing module, wherein the memory stores operating instructions that, when executed by the processing module, cause the processing module to perform functions that include:

determining status of each of the plurality of nodes;

maintaining indications as to the status of each of the plurality of nodes;

when statistics collection configuration information corresponding to a selected node of the plurality of nodes is received and the indication as to the status of the selected node indicates that the status of the selected node is favorable, issuing a statistics request to the selected node based on the statistics collection configuration information; and when the indication as to the status of the selected node indicates that the status of the selected node is unfavorable, delaying issuance of statistics requests to the node until a favorable response is received in response to a subsequently issued status monitoring packet.

12. The statistics collection block of claim 11 further comprises a list of nodes in which the statistics collection block maintains the indications as to the status of each of the nodes of the plurality of nodes.

13. The statistics collection block of claim 12, wherein the plurality of nodes are included in a segment of the data communications network and wherein the statistic configuration information is received from a statistic management block.

14. The statistics collection block of claim 11, wherein the memory further stores operating instructions such that the processing module determines the status of each of the plurality of nodes by issuing a status monitoring packet to the node and determining if a response is received within a predetermined response time, wherein status of the node is favorable if the response is received within the predetermined response time.

15. The statistics collection block of claim 14, wherein the status monitoring packets are issued to the nodes as universal data protocol (UDP) status monitoring packets.

16. A statistics collection circuit for use with a data communications network that includes a plurality of node segments, comprising:

a plurality of statistics collection blocks, wherein each of the plurality of statistics collection blocks is operably coupled to a corresponding node segment within the data communications network, wherein each of the plurality of statistics collection blocks maintains indications as to status of each node included in a corresponding node segment, wherein each of the static collection blocks selectively issues statistics requests to a node in the corresponding node segment in response to statistics collection configuration information received, wherein statistics requests are selectively issued based on the indication as to status of the node, wherein responses to statistics requests from the nodes in corresponding segments are collected by each of the plurality of statistics collection blocks to generate segment statistics;

a statistics management block operably coupled to each of the plurality of statistics collection blocks, wherein the statistics management block receives a network statistics request and generates the static collection configuration information provided to each of the plurality of statistics collection blocks based on the network statistics request; and a statistics aggregation block operably coupled to the plurality of statistics collection blocks, wherein the statistics aggregation block receives the segment statistics generated by each of the statistics collection block in response to the collection configuration information, wherein the statistics aggregation block aggregates the segment statistics to produce compiled statistics that are provided as a response to the network statistics request received by the statistic management block.

17. The statistics collection circuit of claim 16, wherein each of the plurality of statistics collection blocks maintains indications as to the status of each of the nodes in a corresponding node segment by periodically issuing status monitoring packets to each of the nodes.

18. The statistics collection circuit of claim 17, wherein the status monitoring packets are issued as universal data protocol (UDP) status monitoring packets.

19. The statistics collection circuit of claim 18, wherein if the status of a node is determined to be unfavorable by a lack of response to a status monitoring packet within a predetermined response time, statistics requests to the node are delayed until favorable status of the node is determined by a timely response to a subsequently issued status monitoring packet.

20. The statistics collection circuit of claim 19, wherein status monitoring packets are issued to different nodes in each segment with different periodicity based on a prioritization scheme.

21. The statistics collection circuit of claim 20, wherein the prioritization scheme is configured such that more active nodes receive status monitoring packets more often than less active nodes.

22. The statistics collection circuit of claim 16, wherein each of the plurality of statistics collection blocks maintains a list that stores the status of nodes in the node segment to which the collection block corresponds.

23. The statistics collection circuit of claim 22, wherein the list in each statistics collection block stores hierarchical status of each node in the node segment to which the static collection block corresponds, wherein the hierarchical status includes status of components of each of the nodes.

24. The statistics collection circuit of claim 23, wherein the components of each of the nodes further comprises at least one of cards, devices, and connections supported by the node.

25. The statistics collection circuit of claim 16, wherein compiled statistics generated by the statistics aggregation block relate to at least one of billings for network usage, network performance management, and network fault management.

26. The statistics collection circuit of claim 16, wherein nodes included in the node segments asynchronous transfer mode (ATM) nodes.

27. The statistics collection circuit of claim 16, wherein at least a portion of the statistics requests are issued using Simple Network Management Protocol (SNMP).

* * * * *